US 7,210,144 B2

United States Patent
Traut

(10) Patent No.: US 7,210,144 B2
(45) Date of Patent: Apr. 24, 2007

(54) METHOD FOR MONITORING AND EMULATING PRIVILEGED INSTRUCTIONS OF PROGRAMS IN A VIRTUAL MACHINE

(75) Inventor: Eric P. Traut, San Carlos, CA (US)

(73) Assignee: Microsoft Corporation, Redmond, WA (US)

(*) Notice: Subject to any disclaimer, the term of this patent is extended or adjusted under 35 U.S.C. 154(b) by 606 days.

(21) Appl. No.: 10/211,148

(22) Filed: Aug. 2, 2002

(65) Prior Publication Data

US 2004/0025158 A1  Feb. 5, 2004

(51) Int. Cl.
 G06F 9/455 (2006.01)
 G06F 9/46 (2006.01)
 G06F 12/00 (2006.01)
 G06F 12/14 (2006.01)
 G06F 17/30 (2006.01)

(52) U.S. Cl. ............... 718/1; 718/100; 703/23; 703/24; 703/25; 703/26; 703/27; 703/28; 710/200; 726/27

(58) Field of Classification Search ........... 718/1, 718/102–103, 100; 703/22, 23–28; 710/200; 726/27
See application file for complete search history.

(56) References Cited

U.S. PATENT DOCUMENTS 6,694,457 B2 * 2/2004 McKee ............... 714/38
2002/0143799 A1 * 10/2002 Jourdan et al. ......... 707/200

* cited by examiner

Primary Examiner—William Thomson
Assistant Examiner—Qing-Yuan Wu
(74) Attorney, Agent, or Firm—Woodcock Washburn LLP

(57) ABSTRACT

A method for monitoring and emulating privileged instructions of a program that is being executed at a privilege level in a virtual machine is disclosed. A privilege level associated with a received instruction is determined. The instruction privilege level is compared to the program execution privilege level. If the instruction privilege level is valid with respect to the program execution privilege level, the instruction is executed. If the instruction privilege level is invalid with respect to the program execution privilege level: the instruction result is emulated; the number of times the instruction has been received from the program is checked; and if the instruction has been received more than a specified number of times, the instruction is overwritten with one or more instructions with a valid privilege level with respect to the program execution privilege level.

20 Claims, 4 Drawing Sheets

METHOD FOR MONITORING AND EMULATING PRIVILEGED INSTRUCTIONS OF PROGRAMS IN A VIRTUAL MACHINE

TECHNICAL FIELD OF THE INVENTION

The present invention relates in general to the field of virtual machines and, more particularly, to a method for monitoring and emulating privileged instructions of programs in a virtual machine.

BACKGROUND OF THE INVENTION

Computers include general purpose central processing units (CPUs) that are designed to execute a specific set of system instructions. A group of processors that have similar architecture or design specifications may be considered to be members of the same processor family. Examples of current processor families include the Motorola 680X0 processor family, manufactured by Motorola, Inc. of Phoenix, Ariz.; the Intel 80X86 processor family, manufactured by Intel Corporation of Sunnyvale, Calif.; and the PowerPC processor family, which is manufactured by Motorola, Inc. and used in computers manufactured by Apple Computer, Inc. of Cupertino, Calif. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processors instruction set. As an example, the instruction set used by the Intel 80X86 processor family is incompatible with the instruction set used by the PowerPC processor family. The Intel 80X86 instruction set is based on the Complex Instruction Set Computer (CISC) format. The Motorola PowerPC instruction set is based on the Reduced Instruction Set Computer (RISC) format. CISC processors use a large number of instructions, some of which can perform rather complicated functions, but which require generally many clock cycles to execute. RISC processors use a smaller number of available instructions to perform a simpler set of functions that are executed at a higher rate.

The uniqueness of the processor family among computer systems also typically results in incompatibility among the other elements of hardware architecture of the computer systems. A computer system manufactured with a processor from the Intel 80X86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system.

A computer manufacturer will want to maximize its functionality by having more rather than fewer applications run on the microprocessor family associated with the computer manufacturer's product line. To expand the number of operating systems and application programs that can run on a computer system, a field of technology has developed in which a given computer having one type of CPU, called a host, will run an emulator program that allows the host computer to emulate receiving and executing the instructions of an unrelated type of CPU, called a guest. Thus, the host computer will execute an application that will cause one or more host instructions to be called in response to a given guest instruction. In some cases, the host computer can both run software designed for its own hardware architecture, other than the emulation program, and software written for computers having an unrelated hardware architecture. As a more specific example, a computer system manufactured by Apple Computer, for example, may run operating systems and programs written for PC-based computer systems. It may also be possible to use an emulator program to concurrently operate multiple incompatible operating systems on a single CPU. In this arrangement, although each operating system is incompatible with the other, an emulator program can host one of the two operating systems, allowing the otherwise incompatible operating systems to run concurrently on the same computer system.

When a guest computer system is emulated on a host computer system, the guest computer system is said to be a virtual machine, as the guest computer system exists only as a software representation of the operation of the hardware architecture of the guest computer system. The terms emulator and virtual machine are sometimes used interchangeably to denote the ability to mimic or emulate the hardware architecture of an entire computer system. As an example, the Virtual PC software created by Connectix Corporation of San Mateo, Calif. emulates an entire computer that includes an Intel 80X86 Pentium processor and various motherboard components and cards. The operation of these components is emulated in the virtual machine that is being run on the host machine. An emulator program executing on the operating system software and hardware architecture of the host computer, such as a computer system having a PowerPC processor, mimics the operation of the entire guest computer system. The emulator program acts as the interchange between the hardware architecture of the host machine and the instructions transmitted by the software running within the emulated environment.

Virtual machines are sometimes used to support software programs that expect to control the entire computer system. For example, two virtual machine instances can each support an independent instance of the same operating system (OS). The operating system running within a virtual machine can be referred to as a "guest operating system". Some operating systems are written assuming that only one OS is operating on a computer system at a time, allowing the OS to act as a final arbiter of all resources that make up that system (including memory, processor cycles, and access to I/O devices). Because of these built-in assumptions, OS-level code includes instructions that are meant to affect the entire computer system that the OS is controlling. In some virtual machine environments, however, it is necessary to isolate different guest OS instances from each other. Each such OS, therefore, cannot be allowed to directly execute instructions that will affect the entire host system. The virtual machine program can be designed to handle such instructions in a way that is transparent to the guest OS (meeting that OS's original assumptions) while preventing any guest OS from obtaining complete control over a particular host system resource. For example, if a guest operating system errantly executes an "infinite loop" (i.e. a loop of code that fails to terminate), the virtual machine program can prevent that guest operating system from consuming all of the processor cycles on the host machine, and hence "locking out" all other guest OS instances.

Some conventional virtual machines accomplish this task through the use of a multi-level privilege mechanism incorporated into most modern microprocessors. This privilege mechanism allows code to run in one of two (or more) privilege levels. Instructions that affect the state of the entire computer system are often considered "more privileged" than generic computational instructions. The former class of instructions is allowed only in the "more privileged" state, whereas the latter class of instructions is allowed at all privilege levels. Typically, an operating system runs at the "more privileged" mode, and user-level (application) code runs in the "less privileged" mode. A virtual machine can run guest OS code (which was originally written to assume more privilege access) within a lesser privileged mode. When the processor encounters an instruction within the guest OS code that is only allowed at a more privileged level, it will report the "privilege violation" in the form of a processor trap. This trap invokes an exception handler within the virtual machine program that is able to emulate the effects of the privileged instruction without affecting the entire host system.

For example, a guest OS can temporarily disable processor interrupts using the processor's "interrupt mask" feature. If the guest OS were allowed to disable all interrupts on the host system, it could prevent input and output from all devices to the host and all other virtual machines. This would not be consistent with "isolation" between guest environments and the host environment. However, access to the interrupt mask feature is considered "privileged", so any attempt by the guest OS to modify the interrupt mask setting would result in a trap, which would invoke the virtual machine program's exception handler. The exception handler could emulate the modification of the interrupt mask, for example, by modifying some state that is private to the virtual machine, allowing the host system's interrupt mask to remain unmodified.

This method of relying on the processor to trap attempts to execute privileged instructions can slow performance. The OS may execute such privileged instructions often, because it was designed to function on a system that would allow such instructions with minimal overhead. By contrast, the trap mechanism in most processors is much slower. Consequently, the code may run significantly slower within a virtual machine because of the overhead imposed by the trap mechanism and the execution of the exception handler.

SUMMARY OF THE INVENTION

The present invention in one implementation provides a method for monitoring and emulating privileged instructions of a program that is being executed at a privilege level in a virtual machine. A privilege level associated with a received instruction is determined. The instruction privilege level is compared to the program execution privilege level. If the instruction privilege level is valid with respect to the program execution privilege level, the instruction is executed. If the instruction privilege level is invalid with respect to the program execution privilege level: the instruction result is emulated; the number of times the instruction has been received from the program is checked; and if the instruction has been received more than a specified number of times, the instruction is overwritten with one or more instructions with a valid privilege level with respect to the program execution privilege level.

The present invention also provides a program stored in a tangible medium for monitoring and emulating privileged instructions of a guest program that is being executed at a privilege level in a virtual machine. The program includes executable instructions that cause a computer to determine a privilege level associated with a received instruction. The computer compares the instruction privilege level to the guest program execution privilege level. If the instruction privilege level is valid with respect to the program execution privilege level, the computer executes the instruction. If the instruction privilege level is invalid with respect to the program execution privilege level: (1) the computer emulates the instruction result; (2) the computer checks the number of times the instruction has been received from the guest program; and (3) if the instruction has been received more than a specified number of times, the computer overwrites the instruction with one or more instructions with a valid privilege level with respect to the program execution privilege level.

An advantage of one implementation of the present invention is that it blocks guest programs from executing certain privileged instructions.

Another advantage of an implementation of the present invention is that it only overwrites privileged instructions that are often used by the guest program. This is advantageous because modification of the guest program instructions imposes a certain degree of compatibility risk. By selecting only the most frequently executed instructions to modify, the invention allows for both high performance and a high degree of compatibility.

One implementation of the method and program of the present invention has the advantage of monitoring high privilege instruction usage using the small amount of memory necessary for a hash table.

No one of the preceding advantages is critical to the invention. Particular implementations of the invention may achieve only a subset of the advantages. For example, one implementation of the invention may only block guest programs from executing certain privileged instructions. Other technical advantages of the present invention will be readily apparent to one skilled in the art from the following figures, descriptions, and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1:
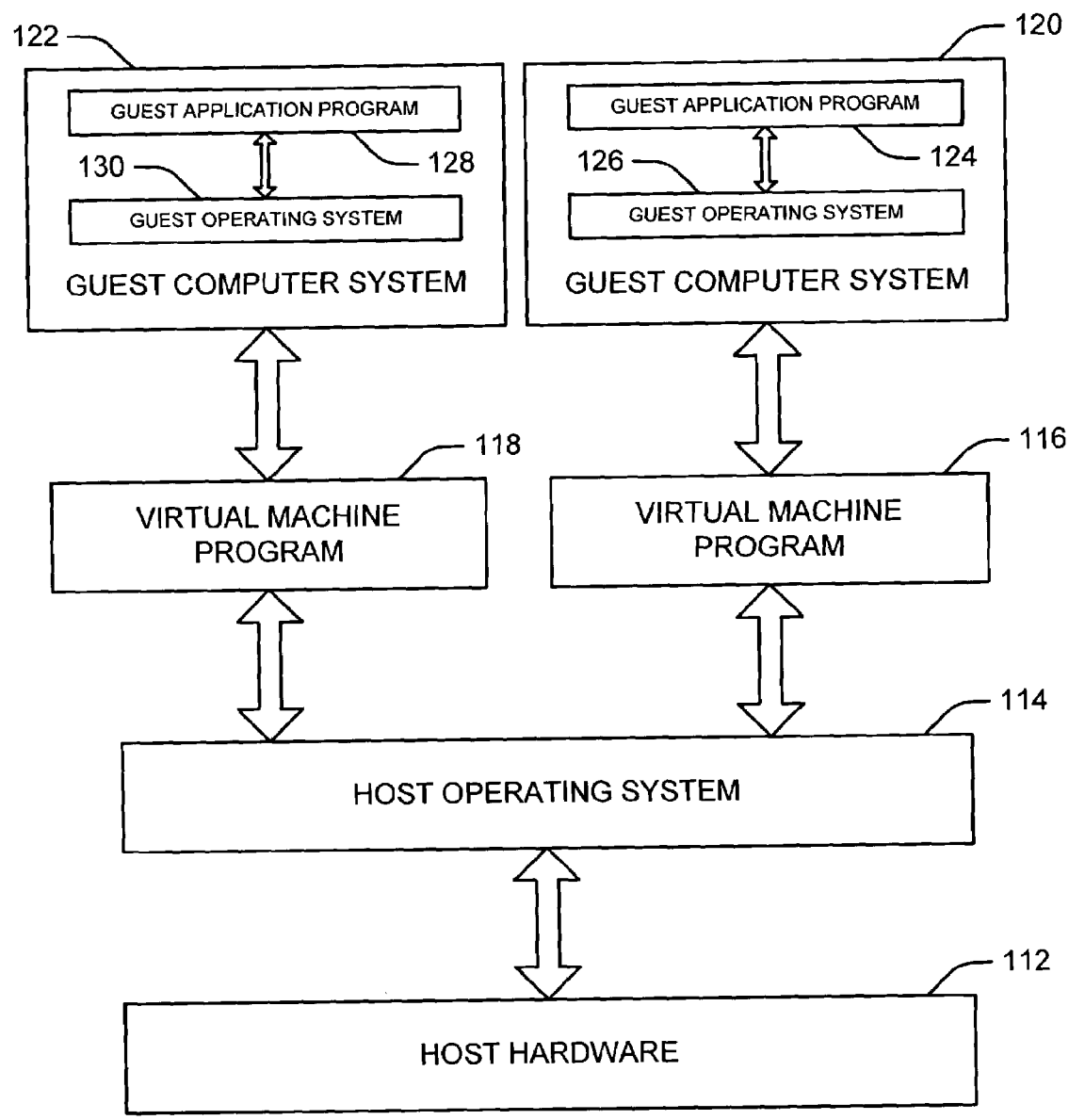
FIG. 1 is a diagram of the logical relationship of the elements of emulated computer systems running in a host computer system.

In the case of an emulated computer system or virtual machine, a virtual machine program provides a virtualized operating environment in the host computer system. Shown in FIG. 1 is a diagram of the logical layers of the hardware and software architecture for two virtual machine operating environments in a computer system 110. Virtual machine programs 116, 118 run on a host operating system 114 that executes on the host computer system hardware or processor 112. Virtual machine program 116 emulates a guest computer system 120, including a guest operating system 126. Virtual machine program 118 emulates a guest computer system 122, including a guest operating system 130. The guest operating systems 126, 130 can be of the type that can be run on the host hardware 112 (in which case instruction emulation may not be necessary). Guest application programs 124, 128 are able to execute on guest operating systems 126, 130, respectively. In the virtual machine operating environment of FIG. 1, because of the operation of virtual machine program 116, guest application 124 can run on the computer system 110 even though guest application 124 is designed to run on an operating system that is generally incompatible with host operating system 114 and host computer system hardware 112.

Figure 2:
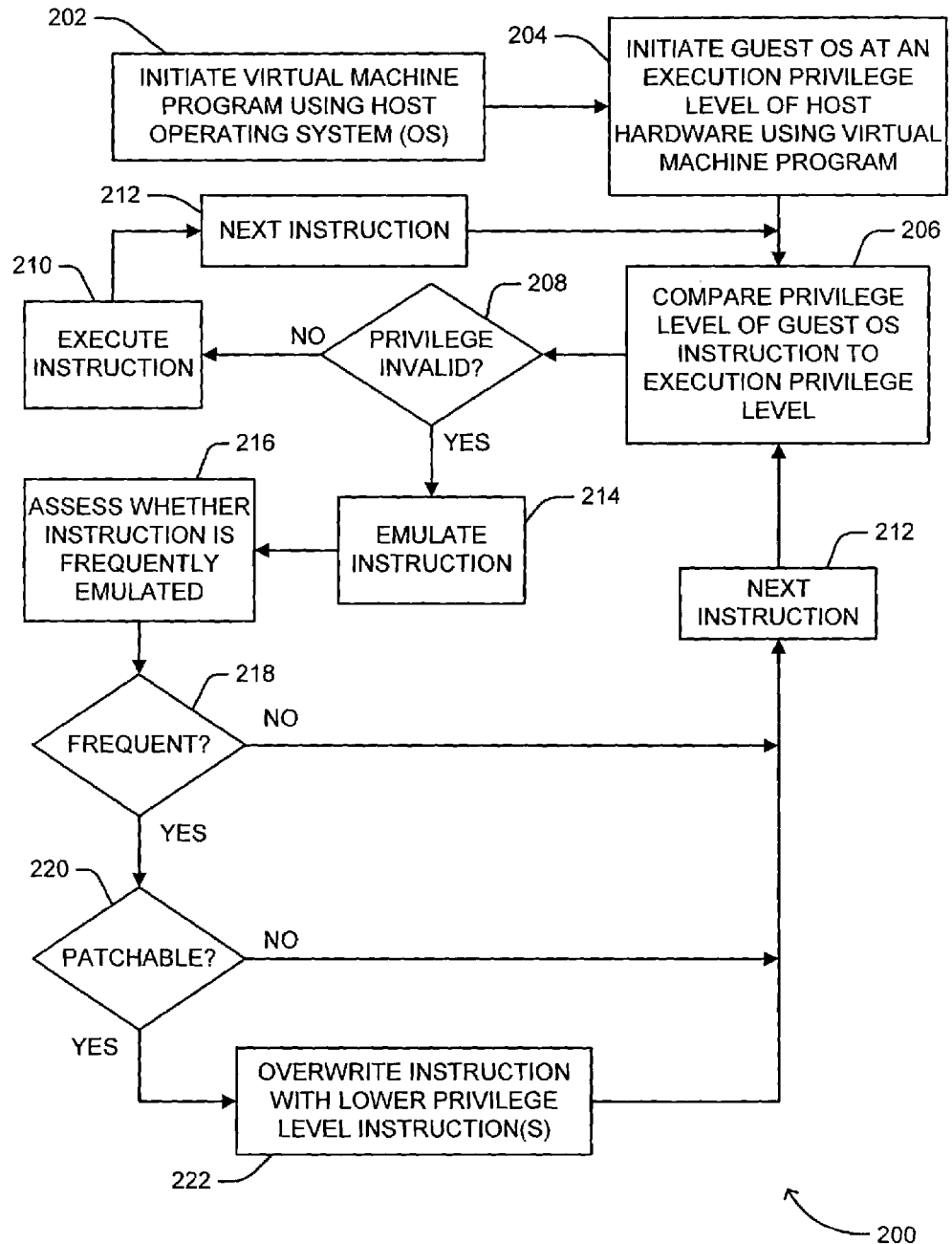
FIG. 2 is a flow diagram of a method for monitoring and emulating privileged instructions of a program running in a virtual machine.

Referring now to FIG. 2, a method for monitoring and emulating privileged instructions of a program running in a virtualized system 200 is depicted. A virtual machine program is initiated using the host OS 202. A guest OS is then initiated at an execution privilege level of the host hardware using the virtual machine program 204. In one implementation, the execution privilege level is a level used for applications running on the host OS, not the level used for the host OS. The privilege level of an instruction of the guest OS is compared to the execution privilege level 206. If the instruction privilege level is valid with respect to the execution privilege level 208, the instruction is executed 210. The next instruction of the guest OS is then retrieved 212.

Figure 3:
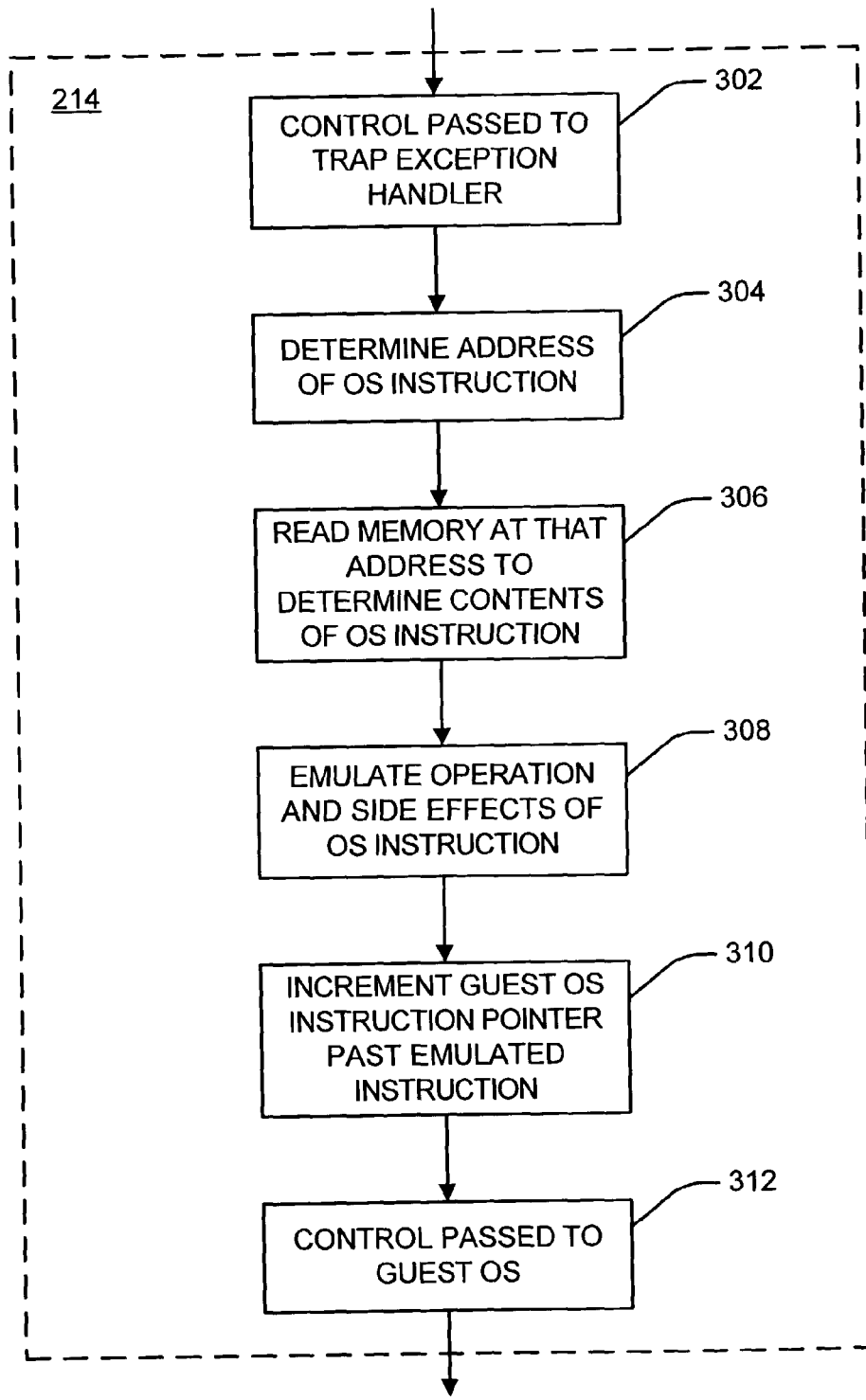
FIG. 3 is a flow diagram of emulating an invalid privilege level instruction.
Figure 4:
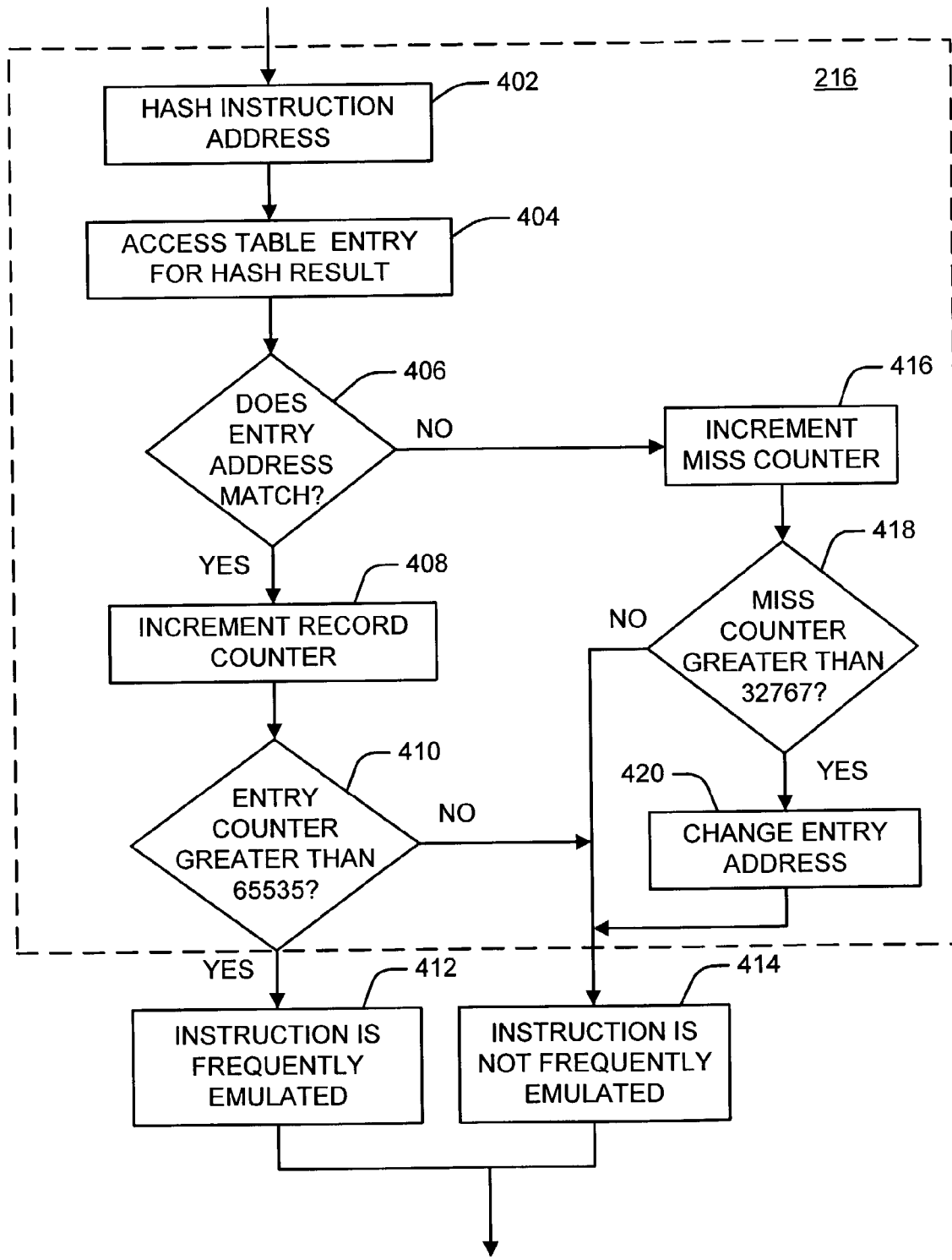
FIG. 4 is a flow diagram of assessing whether an instruction is frequently emulated.

If the instruction privilege level is invalid with respect to the execution privilege level 208, the instruction is emulated 214. FIG. 3 further details the step of emulating the instruction 214. Once the instruction has been emulated, the virtual machine program assesses whether the instruction is frequently emulated 216. FIG. 4 further details the step of assessing whether the instruction is frequently emulated 216. In another implementation, the assessment occurs before the emulation. If the instruction is not frequently emulated 218, the next instruction of the guest OS is then retrieved 212. If the instruction is frequently emulated 218, but the instruction is not patchable 220, the next instruction of the guest OS is then retrieved 212. An instruction can be unpatchable for several reasons, including, instruction sets with multiple length instructions where the patch would employ an instruction having a different length that upsets a branch pointing at a particular address. Other emulated instructions can be unpatchable because the side effects of the instruction cannot be completely emulated in a patch.

If the instruction is frequently emulated 218 and it can be patched 220, the instruction is overwritten with one or more instructions having valid privilege level(s) with respect to the execution privilege level—the patch 222. Once the patch has been applied, the valid privilege level(s) will not invoke the emulation for that instruction in the future. The emulation program proceeds with the next instruction from the guest OS 212.

FIG. 3 depicts the step of emulating the instruction 214 in more detail. Control is passed to the virtual machine program's trap exception handler 302. The trap exception handler determines the linear address of the guest OS instruction that caused the trap exception 304. A memory read of that location yields the instruction that caused the trap exception 306. Based on the instruction encoding, the exception handler then emulates the operation and side effects of the instruction in such a way that does not affect the entire host system 308.

For example, if the guest OS instruction attempted to mask interrupts, the trap exception handler can set a virtual interrupt mask flag for that OS and not pass on interrupts until that OS has disabled that flag. As a more specific example, in the Intel architecture, the interrupt mask flag (IF) is controlled by the privileged instructions STI, which sets IF, and CLI, which clears IF. When the IF is cleared, interrupts, including many forms of user input, are ignored by the processor. When the guest OS attempts to execute a STI or CLI instruction within the execution privilege level, the privilege level is inadequate and the trap exception handler is invoked. The virtual machine program maintains a virtual IF for that guest OS. In response to a processor notification that the guest OS attempted an STI instruction, the virtual machine program sets the virtual IF. In response to a processor report that the guest OS attempted a CLI instruction, the virtual machine program clears the virtual IF. The virtual machine program uses the virtual IF to determine whether it should pass on interrupts to the guest OS. All of this is accomplished without modifying the host processor's actual IF. Clearing the actual IF would disable interrupts for the entire system.

Once the guest OS instruction has been emulated by the exception handler 308, the instruction pointer for the guest OS is incremented past the emulated instruction 310, and the next instruction is then ready to be executed. Control is then passed to the guest OS 312, though this may not occur until after the exception handler assesses whether the execution of the privileged instruction is frequent.

FIG. 4 depicts a step of assessing whether an instruction is frequently emulated 216. A hash function is applied to the address of the instruction that caused a trap exception 402. As discussed previously, in alternate implementations, the emulation of the instruction may occur before or after the exception handler assesses whether the instruction is frequently emulated. A previously-generated table includes entries corresponding to each possible result of the hash function. In one implementation, the hash function results in fewer possible results than the possible input instruction addresses because multiple addresses result in the same hash index. For example, a hash that divides the instruction by a division value and uses the remainder as the result will provide the same result for two instruction addresses that differ by the division value. The exception handler accesses the table entry that corresponds to the resulting hash index 404.

In one implementation, the hash table entry includes a field for storing the address of an instruction. If the hash result has not occurred previously, the field is empty and the current instruction address is written therein. If the address field has a value and that value matches the address of the current trapping instruction 406, then a counter field in the record is incremented 408. The counter field corresponds to the number of times that an instruction at a particular address hash has caused a trap exception, subject to the miss counter described below. If the counter field exceeds a particular value 410, in one implementation that value is 65535, then the trapping instruction is determined to be frequent 412. If the counter does not exceed that value 410, then the trapping instruction at this address is determined to be infrequent 414.

If the address field has a value and that value is not the same as the address of the currently trapping instruction 406, then a miss counter field in the record is incremented 416. The miss counter field corresponds to the number of times that instructions having addresses that produce the hash for the entry, but are not currently being counted to determine if they are frequent, result in traps. If the miss counter field exceeds a particular value 418, in one implementation that value is 32767, then the address field in the record is changed to the address of the currently trapping instruction.

The miss counter field allows the trap exception handler to limit memory usage to a hashed table, while still allowing privilege-violating instructions that are more frequently executed to be counted in the place of privilege-violating instructions that are less frequently executed, but happened to be encountered first. Whether or not the instruction address field in the record is changed, the trapping instruction is determined to be infrequent. A patch of the instruction is not attempted until the instruction has been assessed as frequent, see flowchart of FIG. 2.

In an alternative implementation, each hash table entry is associated with a linked list that references each of the trapping instruction addresses corresponding to the hash index. This approach uses more memory than the above-described hit counter/miss counter approach. Like the miss counter approach, the linked list allows the exception handler to patch an often used privilege-violating instruction despite the presence of another privilege-violating instruction the address of which has the same hash index.

The present invention is not limited in its application to the virtualization of a particular computer system architecture, particularly the Intel 80x86 architecture.

Although the present invention has been described in detail, it should be understood that various changes, substitutions, and alterations can be made thereto without departing from the spirit and scope of the invention as defined by the appended claims.

What is claimed is:

1. A computer-implemented method for monitoring and emulating privileged instructions of a program that is being executed at a privilege level in a virtual machine, comprising the steps of:
   (a) receiving an instruction of the program and determining a privilege level associated with the instruction;
   (b) comparing the instruction privilege level to the program execution privilege level;
   (c) determining that the instruction privilege level is invalid with respect to the program execution privilege level, and performing the following steps:
      (i) emulating the instruction;
      (ii) checking how many times the instruction has been emulated; and
      (iii) determining that the instruction has been emulated more than a specified number of times, and overwriting the instruction with one or more instructions with a privilege level that is valid with respect to the program execution privilege level.

2. The method of claim 1, wherein the program is an operating system.

3. The method of claim 1, wherein the instruction has an address and checking how many times the instruction has been emulated includes incrementing a counter in a table record corresponding to the instruction address.

4. The method of claim 3, wherein a table entry corresponding to the instruction address matches an output of a hash function applied to the instruction address.

5. The method of claim 1, further comprising the step of:
   generating a table including records each having two counters and an instruction address; wherein the first counter is equal to the number of times that the instruction has been received; and the second counter is equal to the number of times that different instructions have been received.

6. The method of claim 5 wherein the instruction address of a record is changed to a second instruction address when the second counter exceeds a second specified number.

7. The method of claim 6, wherein the second specified number is 32767.

8. The method of claim 1 further comprising the steps of:
   generating a table including entries each corresponding to a result of a hash function applied to an instruction address; and
   generating linked lists for each record including a count of a number of times that instructions corresponding to the record have been received.

9. The method of claim 1 wherein the specified number is 65535.

10. A computer program, stored on a tangible storage medium, for use in monitoring and emulating privileged instructions of a guest program that is being executed at a privilege level in a virtual machine, the program including executable instructions that cause a computer to:
    (a) receive an instruction of the guest program and determining a privilege level associated with the instruction;
    (b) compare the instruction privilege level to the guest program execution privilege level;
    (c) if the instruction privilege level is valid with respect to the guest program execution privilege level, execute the instruction;
    (d) if the instruction privilege level is invalid with respect to the guest program execution privilege level:
       (i) emulate the instruction;
       (ii) check how many times the instruction has been emulated; and
       (iii) if the instruction has been emulated more than a specified number of times, overwrite the instruction with one or more instructions with a privilege level that is valid with respect to the guest program execution privilege level.

11. The program of claim 10, wherein the guest program is an operating system.

12. The program of claim 10, wherein the instruction has an address and checking how many times the instruction has been emulated includes incrementing a counter in a table record corresponding to the instruction address.

13. The program of claim 12, wherein a table entry corresponding to the instruction address matches an output of a hash function applied to the instruction address.

14. The program of claim 10, including further executable instruction that cause a computer to:
    (e) generate a table including records each having two counters and an instruction address;
    wherein the first counter is equal to the number of times that the instruction has been received; and the second counter is equal to the number of times that different instructions have been received.

15. The program of claim 14 wherein the instruction address of a record is changed to a second instruction address when the second counter exceeds a second specified number.

16. The program of claim 15, wherein the second specified number is 32767.

17. The program of claim 10 including further executable instruction that cause computer to:
    (e) generate a table including entries each corresponding to a result of hash function applied to an instruction address; and
    (f) generate linked lists for each record including a count of a number of times that instructions corresponding to the record have been received.

18. The program of claim 10 wherein the specified number is 65535.

19. A computer program, stored on a computer readable medium, the program including computer readable instructions for causing a computer to perform the following steps:
   initiating the execution of a guest computer system at a guest program execution privilege level in a virtual machine program running on a host operating system and host computer hardware;
   receiving an instruction of the guest computer system and determining an instruction privilege level associated with the instruction;
   determining that the instruction privilege level is invalid with respect to the guest program execution privilege level;
   determining that the instruction has been emulated more than a predetermined number of times; and
   overwriting the instruction with one or more instructions with a privilege level that is valid with respect to the guest program execution privilege level.

20. A computer program stored on a computer readable medium as recited in claim 19, further comprising computer readable instructions for causing a computer to perform the step of emulating the instruction after determining that the instruction privilege level is invalid with respect to the guest program execution privilege level.

* * * * *